(12) United States Patent
Mangalaparthi et al.

(10) Patent No.: US 11,765,278 B2
(45) Date of Patent: Sep. 19, 2023

(54) REPLAY AGENT FOR DELIVERING CHARGING EVENT MESSAGES FROM A MESSAGE BROKER IN A MOBILE TELECOMMUNICATIONS NETWORK

(71) Applicant: Microsoft Technology Licensing, LLC, Redmond, WA (US)

(72) Inventors: Rama Krishna Prasad Mangalaparthi, Ameenpur (IN); Anthony Raj, Bengaluru (IN); Ronald Mark Parker, Manchester, MA (US); Michael Anthony Brown, McKinney, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 17/227,161

(22) Filed: Apr. 9, 2021

(65) Prior Publication Data
US 2022/0329699 A1 Oct. 13, 2022

(51) Int. Cl.
*H04M 15/00* (2006.01)
*H04W 4/24* (2018.01)

(52) U.S. Cl.
CPC ......... *H04M 15/67* (2013.01); *H04M 15/844* (2013.01); *H04M 15/853* (2013.01); *H04W 4/24* (2013.01); *H04M 2215/8137* (2013.01); *H04M 2215/8162* (2013.01)

(58) Field of Classification Search
CPC .. H04M 15/67; H04M 15/844; H04M 15/853; H04M 4/24; H04M 2215/8137; H04M 2215/8162; H04M 15/41; H04M 15/53; H04M 15/64; H04M 15/65;
(Continued)

(56) References Cited

U.S. PATENT DOCUMENTS 6,886,044 B1 4/2005 Miles et al.
7,613,597 B2 11/2009 Vertes
9,992,056 B2 6/2018 Ward et al.
(Continued)

OTHER PUBLICATIONS

"International Search Report and Written Opinion Issued in PCT Application No. PCT/US22/021069", dated Jul. 19, 2022, 18 Pages.
(Continued)

*Primary Examiner* — Marcos L Torres
(74) *Attorney, Agent, or Firm* — RAY QUINNEY & NEBEKER P.C; James Bullough

(57) ABSTRACT

A system for preserving charging event messages in a mobile telecommunications network when a charging server is unavailable includes a message broker comprising persistent storage. The system also includes a network element that generates a charging event message, attempts to send the charging event message to a charging server, and writes the charging event message to the message broker in response to determining that the attempt to send the charging event message to the charging server has failed. The system also includes a replay agent that subscribes to the message broker for notifications associated with the charging server, receives a notification from the message broker about the charging event message, reads the charging event message from the message broker, and causes the charging event message to be sent to the charging server when the charging server is available.

17 Claims, 9 Drawing Sheets

(58) Field of Classification Search
CPC ... H04M 15/66; H04M 15/74; H04L 12/1403; H04L 12/1407
See application file for complete search history.

(56) References Cited

U.S. PATENT DOCUMENTS

| | | |
|---|---|---|
| 10,481,948 B2 | 11/2019 | Grenader |
| 10,560,544 B2 | 2/2020 | Grenader |
| 11,487,878 B1* | 11/2022 | Zhang ................ G06F 8/433 |
| 2006/0056628 A1* | 3/2006 | Todd ................ H04L 67/55 |
| | | 380/233 |
| 2016/0205106 A1 | 7/2016 | Yacoub et al. |
| 2017/0242765 A1* | 8/2017 | Dreyer ................ H04M 15/66 |
| 2018/0359201 A1 | 12/2018 | Rangasamy et al. |
| 2018/0359655 A1 | 12/2018 | Zevallos |
| 2020/0177439 A1* | 6/2020 | Afzal ................ H04L 12/1403 |
| 2021/0400445 A1* | 12/2021 | Chai ................ H04W 88/18 |

OTHER PUBLICATIONS

Luckow, et al., "Pilot-Streaming: A Stream Processing Framework for High-Performance Computing", In Proceedings of IEEE 14th International Conference on e-Science (e-Science), Oct. 29, 2018, pp. 177-188.

Oh, et al., "A Scalable and Adaptive Cloud-Based Message Brokering Service", In Proceedings of 13th International Conference on Advanced Communication Technology, Feb. 13, 2011, pp. 498-501.

* cited by examiner

REPLAY AGENT FOR DELIVERING CHARGING EVENT MESSAGES FROM A MESSAGE BROKER IN A MOBILE TELECOMMUNICATIONS NETWORK

CROSS-REFERENCE TO RELATED APPLICATIONS

N/A

BACKGROUND

The Third Generation Partnership Project (3GPP) is a consortium of a number of standards organizations that develop protocols for mobile telecommunications. 3GPP is responsible for the development of Long-Term Evolution (LTE) and related fourth generation (4G) standards, including LTE Advanced and LTE Advanced Pro. 3GPP is also responsible for the development of fifth generation (5G) standards. 5G systems are already being deployed and are expected to become widespread in the near future.

In a 3GPP network (i.e., a network that is configured to operate in accordance with one or more 3GPP standards), a chargeable event can be any activity utilizing network resources and related services for which the network operator may want to charge money. Chargeable events can involve user-to-user communication (e.g., a single call, a data communication session, a short message), user-to-network communication (e.g., service profile administration), inter-network communication (e.g., transferring calls, signaling, short messages, interconnection), mobility (e.g., roaming, inter-system handover), or user-to-application/service communication.

3GPP networks provide functions that implement offline and/or online charging mechanisms. In order to support these charging mechanisms, the network performs real-time monitoring of resource usage in order to detect the relevant chargeable events.

Offline charging is a mechanism in which charging information does not affect, in real-time, the service rendered. With offline charging, charging information for network resource usage is collected concurrently with that resource usage. The charging information is then passed through a chain of logical charging functions. At the end of this process, charging data record (CDR) files are generated by the network, which are then transferred to the network operator's billing domain (BD) for the purpose of subscriber billing and/or inter-operator accounting (or additional functions, such as statistics, at the operator's discretion). An offline charging system (OFCS) can include one or more charging functions used for offline charging.

For offline charging, a charging trigger function (CTF) can generate charging events based on the observation of network resource usage. In a network element that provides charging information, the CTF can be the focal point for collecting the information pertaining to chargeable events within the network element, assembling this information into matching charging events, and sending these charging events towards a charging data function (CDF). A CDF can receive charging events from a CTF and use the information contained in the charging events to construct CDRs.

Online charging is a mechanism where charging information can affect, in real-time, the service rendered. With online charging, charging information for network resource usage can be collected concurrently with that resource usage in the same fashion as in offline charging. However, authorization for the network resource usage is obtained by the network before the actual resource usage occurs. An online charging system (OCS) can include one or more charging functions used for offline charging. An OCS can perform real-time credit control. Credit control is a mechanism that directly interacts in real-time with an account and controls or monitors the charges that related to the service usage.

A CTF can also create the charging events used for online charging. In the case of online charging, the charging events can be forwarded to an online charging function (OCF) in order to obtain authorization for the chargeable event and/or network resource usage requested by the user. A CTF can delay the actual resource usage until permission has been granted by the OCF.

A charging event is a set of charging information about one or more chargeable events. A charging event can be generated by a network element and forwarded to one or more other network elements. For example, a charging event can be generated by a CTF and then forwarded to the CDF (in the case of offline charging) or towards the OCF (in the case of online charging).

Converged charging is a process where online and offline charging are combined. A converged charging system (CCS) can include a charging function (CHF), a charging gateway function (CGF), and potentially other functions as well. A CHF can include a CDF and an OCF.

A CTF can interact with a CCS using the Nchf interface. The CTF can communicate charging events to the CCS by sending Nchf converged charging messages to the CCS via the Nchf interface.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

At least some embodiments of the present disclosure are directed to a system for preserving charging event messages in a mobile telecommunications network when a charging server is unavailable. The system includes one or more processors and a message broker comprising persistent storage. The system also includes a network element that is executable by the one or more processors to generate a charging event message, attempt to send the charging event message to a charging server, and write the charging event message to the message broker in response to determining that the attempt to send the charging event message to the charging server has failed. The system also includes a replay agent that is executable by the one or more processors to subscribe to the message broker for notifications associated with the charging server, receive a notification from the message broker about the charging event message, read the charging event message from the message broker, and cause the charging event message to be sent to the charging server when the charging server is available.

In some embodiments, the system additionally includes an orchestrator that is configured to vary how many instances of the replay agent are deployed based on a load that is being experienced by the replay agent from the message broker.

In some embodiments, causing the charging event message to be sent to the charging server can include detecting that an attempt to send the charging event message to a primary charging server has failed and causing the charging event message to be sent to a secondary charging server.

In some embodiments, the replay agent is additionally executable by the one or more processors to determine whether a number of outstanding messages associated with the charging server is equal to a maximum value. The charging event message can be sent to the charging server when the number of outstanding messages associated with the charging server is less than the maximum value.

In some embodiments, the message broker can comprise a storage layer of an event streaming platform, and the replay agent can comprise a client application of the event streaming platform.

In some embodiments, the message broker can comprise a topic corresponding to the charging server, and subscribing to the message broker for the notifications associated with the charging server can comprise subscribing to the topic.

In some embodiments, the network element can comprise a charging trigger function (CTF), and the charging server can comprise a charging function (CHF) within a converged charging system (CCS).

At least some embodiments of the present disclosure are directed to a system for preserving charging event messages in a mobile telecommunications network when a charging server is unavailable. The system includes one or more processors and a message broker comprising different types of charging event messages that are written to the message broker by a plurality of network elements. The system also includes a replay agent that is in electronic communication with the message broker and that is also in electronic communication with a plurality of charging servers via a plurality of different protocols. The replay agent is executable by the one or more processors to subscribe to the message broker for notifications associated with the plurality of charging servers, receive a notification from the message broker about a charging event message that has been written to the message broker, read the charging event message from the message broker, identify a charging server where the charging event message should be sent, determine a protocol that should be used to send the charging event message to the charging server, and cause the charging event message to be sent to the charging server using the protocol.

In some embodiments, the system can include a plurality of instances of the replay agent. Each instance of the replay agent can be configured to read the charging event messages from the message broker and cause the charging event messages to be sent to one or more charging servers.

In some embodiments, the plurality of instances of the replay agent can correspond to different network functions.

In some embodiments, the plurality of instances of the replay agent can be implemented within a single network function.

In some embodiments, the system can additionally include an orchestrator that is configured to vary how many instances of the replay agent are deployed based at least in part on a load being experienced by the replay agent from the message broker.

In some embodiments, the orchestrator can be configured to deploy at least one additional instance of the replay agent in response to an increase in the load being experienced by the replay agent from the message broker, and deactivate at least one deployed instance of the replay agent in response to a decrease in the load being experienced by the replay agent from the message broker.

In some embodiments, causing the charging event message to be sent to the charging server can comprise detecting that an attempt to send the charging event message to a primary charging server has failed, and causing the charging event message to be sent to a secondary charging server.

In some embodiments, the replay agent can additionally be executable by the one or more processors to determine whether a number of outstanding messages associated with the charging server is equal to a maximum value, and the charging event message can be sent to the charging server when the number of outstanding messages associated with the charging server is less than the maximum value.

In some embodiments, the message broker can comprise a storage layer of an event streaming platform, and the replay agent can comprise a client application of the event streaming platform.

In some embodiments, the message broker can comprise a topic corresponding to the charging server, and subscribing to the message broker for the notifications comprises subscribing to the topic.

At least some embodiments of the present disclosure are directed to a method for preserving charging event messages in a mobile telecommunications network when a charging server is unavailable. The method is implemented by a replay agent that is in electronic communication with a message broker that comprises a plurality of charging event messages. The method includes subscribing to the message broker for notifications associated with a plurality of charging servers. The method also includes receiving a first notification from the message broker about a first charging event message that has been written to the message broker. The method also includes reading the first charging event message from the message broker. The method also includes causing the first charging event message to be sent to a first charging server using a first protocol. The method also includes receiving a second notification from the message broker about a second charging event message that has been written to the message broker. The method also includes reading the second charging event message from the message broker. The method also includes causing the second charging event message to be sent to a second charging server using a second protocol.

In some embodiments, the first charging server can comprise a charging function (CHF) within a converged charging system (CCS). The first charging event message can comprise an Nchf converged charging message. The first protocol can be associated with an Nchf interface. The second charging server can comprise a charging gateway function (CGF), an online charging system (OCS), or an offline charging system (OFCS). The second protocol can comprise at least one of REpresentational State Transfer (REST), RADIUS, DIAMETER, or a General Packet Radio Service (GPRS) Tunneling Protocol (GTP).

In some embodiments, the first charging event message can be sent to the first charging server when the first charging server becomes available and a number of outstanding messages associated with the first charging server is less than a maximum value. The second charging event message can be sent to the second charging server when the second charging server becomes available and a number of outstanding messages associated with the second charging server is less than the maximum value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
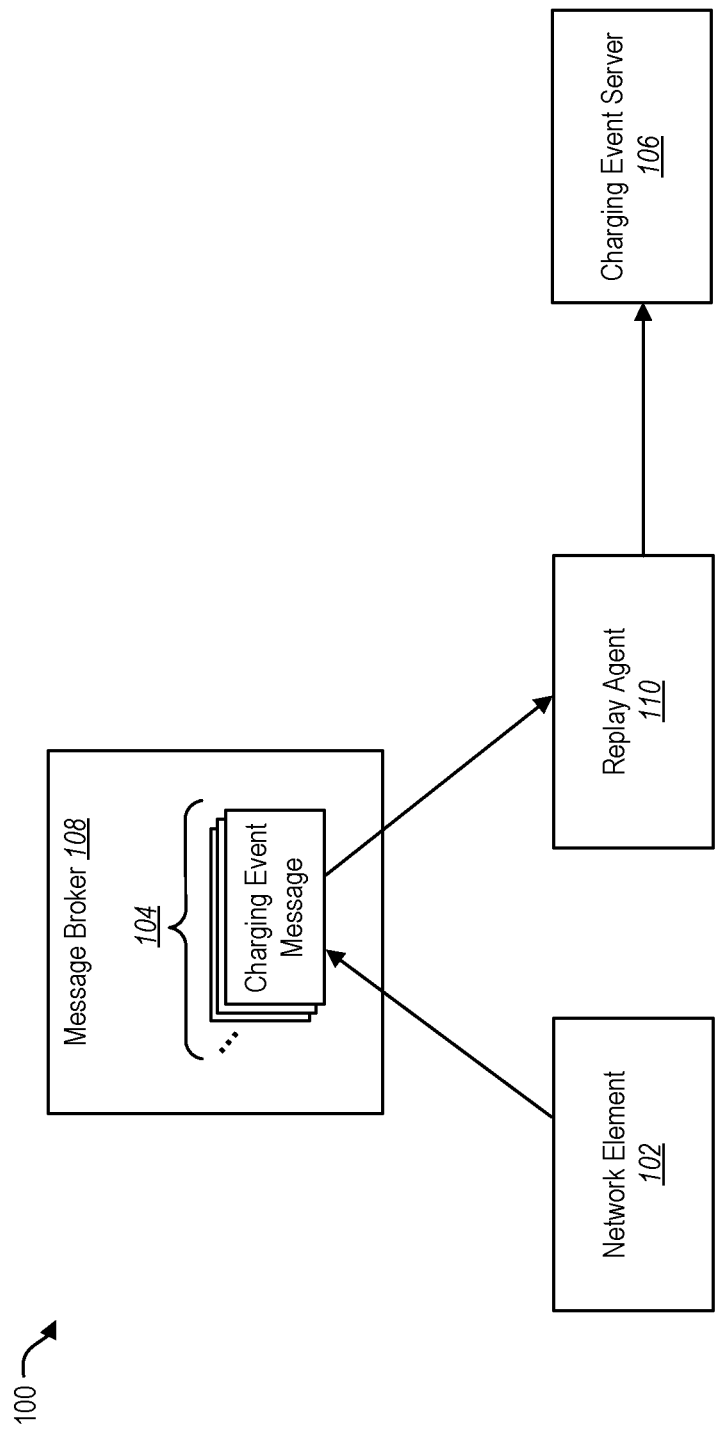
FIG. 1 illustrates an example of a system for preserving charging event messages in a mobile telecommunications network when a charging server is unavailable.

As discussed above, in a 3GPP network, a charging event is a set of charging information about one or more chargeable events. A charging event can be generated by a network element and forwarded to one or more other network elements. A network element that receives charging events from another network element may be referred to herein as a charging server.

An example of a charging server is a CHF. As discussed above, a CTF can record and report charging events to the CHF. These charging events can be reported to the CHF by sending Nchf converged charging messages via the Nchf interface between the CTF and the CHF.

From time to time, a charging server can experience a failure and become unavailable, at least temporarily. If this occurs, it is possible that the charging events that one or more network elements have reported to the charging server could be lost. This can be problematic because it can cause network operators to lose revenue.

The present disclosure is generally related to a scenario in which a charging server has experienced a failure and become at least temporarily unavailable. The present disclosure describes a mechanism for preserving charging events that one or more network elements should report to a charging server in a scenario where the charging server is unavailable.

Messages containing charging events (e.g., Nchf converged charging messages) may be referred to herein as charging event messages. In accordance with the present disclosure, charging event messages can be stored in persistent storage when a charging server has experienced a failure and become unavailable. The charging event messages can then be reported to the charging server once it becomes available again. This can prevent the loss of revenue to network operators that would otherwise occur as a result of the failure of one or more charging servers.

An event streaming platform can be used to implement one or more aspects of the present disclosure. Some examples of event streaming platforms that can be used to implement aspects of the present disclosure include Apache Kafka and RabbitMQ.

Event streaming can refer to the practice of capturing data in real-time from event sources (e.g., mobile devices, sensors, cloud services, software applications, databases) in the form of streams of events and then storing these event streams for later retrieval and processing. An event streaming platform can provide various capabilities that enable event streaming to be implemented for desired use cases. Such capabilities can include the ability to publish (write) and subscribe to (read) streams of events, and to store streams of events durably and reliably. Apache Kafka is one example of an event streaming platform.

An event streaming platform can include a cluster of one or more servers that can span multiple datacenters or cloud regions. Some of these servers can form a storage layer. The storage layer can include entities that are sometimes referred to as brokers. An event streaming platform can also include client applications that read, write, and process streams of events. Producers can be client applications that publish (write) events to the platform, and consumers can be client applications that subscribe to (read and process) these events. Producers and consumers can be fully decoupled and agnostic of each other.

Events can be organized and durably stored in topics. Topics can have a plurality of producers and a plurality of subscribers. In other words, a topic can have zero, one, or many producers that write events to it, as well as zero, one, or many consumers that subscribe to these events.

In accordance with one aspect of the present disclosure, charging event messages can be written to and stored in the storage layer of an event streaming platform. As noted above, the storage layer of an event streaming platform includes entities that are sometimes referred to as brokers. Such entities may be referred to herein as message brokers. Thus, when a network element attempts to send a charging event message to a charging server but the attempt is unsuccessful, the network element can write the charging event message to a message broker.

In accordance with another aspect of the present disclosure, a client application can be provided to read charging event messages from the message broker and deliver them to a charging server when that charging server has become available again. This type of client application may be referred to herein as a replay agent.

In some embodiments, a replay agent in accordance with the present disclosure may be able to read a plurality of different types of charging event messages and deliver each message type to its desired charging server. This feature is significant because a network could include several different types of network elements that are generating charging events. Different network elements can be configured to communicate with charging servers using different protocols. For example, as discussed above, a CTF can communicate charging events to the CCS by sending Nchf converged charging messages to the CCS via the Nchf interface. At the same time, however, another network element (e.g., a packet gateway (PGW)) could be generating charging events and sending the charging events to one or more charging servers using a different protocol, such as REpresentational State Transfer (REST), RADIUS, DIAMETER, the General Packet Radio Service (GPRS) Tunneling Protocol (GTP), etc.

In a scenario where several different types of messages should be read from persistent storage and delivered to different destinations, one possible approach is to have a plurality of different processes, each corresponding to a different message type. This can be an inefficient use of resources, however, because the different processes each consume processing and memory resources even though they are performing substantially similar functions.

In contrast to having a plurality of different processes, each corresponding to a different message type, the present disclosure proposes the use of a replay agent that is configured to support a plurality of different message types. For example, a replay agent as disclosed herein can be configured to read Nchf converged charging messages from the message broker and send them to a CHF. In addition, however, a replay agent as disclosed herein can also be configured to read other types of charging event messages from the message broker and send those charging event messages to charging servers via other types of protocols (e.g., REST, RADIUS, DIAMETER, GTP).

Advantageously, a replay agent as disclosed herein can be capable of delivering charging event messages to a charging server with a deterministic pacing algorithm so that the charging server is not bombarded with a flood of charging event messages. This functionality can be available for all types of charging event messages that the replay agent is capable of sending and all types of charging servers that the replay agent is capable of communicating with.

In addition, a replay agent as disclosed herein can also be configured to support a high availability architecture for charging servers in the form of primary and secondary destinations. More specifically, in the event that a replay agent fails to deliver a charging event message to a primary charging server, the replay agent can attempt to deliver the charging event message to one or more secondary charging servers. This functionality can be available for all types of charging event messages that the replay agent is capable of sending and all types of charging servers that the replay agent is capable of communicating with.

A replay agent as disclosed herein can also be configured for horizontal scalability. In other words, a replay agent can be configured to scale in and/or scale out based on the load that is being experienced at any given point in time. In this context, scaling out refers to increasing the number of instances of the replay agent that are deployed, whereas scaling in refers to decreasing the number of instances of the replay agent that are deployed. When replay agents are scaled out such that a plurality of instances of the replay agent are deployed in parallel, this can enable a plurality of different charging event messages to be replayed to various destinations in parallel. This functionality can be available for all types of charging event messages that the replay agent is capable of sending and all types of charging servers that the replay agent is capable of communicating with.

FIG. 1 illustrates an example of a system 100 in which the techniques disclosed herein can be utilized. The system 100 includes a network element 102. In this context, a network element can be any component within a mobile telecommunications network. The present disclosure is generally related to network elements that generate charging events and send messages containing those charging events (i.e., charging event messages) to a charging server. The system 100 shown in FIG. 1 includes a plurality of charging event messages 104 and a charging server 106.

In some embodiments, the network element 102 can be a CTF, the charging server 106 can be a CHF within a CCS, and the charging event messages 104 can be Nchf converged charging messages. As discussed above, a CTF can send Nchf converged charging messages to the CHF via the Nchf interface.

As discussed above, from time to time a charging server 106 can experience a failure and become unavailable. If this occurs, it is possible that the charging event messages 104 that a network element 102 sends to the charging server 106 could be lost. This can be problematic because the failure of the charging server 106 can cause network operators to lose revenue. The present disclosure describes a mechanism for preserving charging event messages 104 in a scenario where a charging server 106 has become unavailable.

In accordance with one aspect of the present disclosure, charging event messages 104 can be written to and stored in a message broker 108. In some embodiments, the message broker 108 can be implemented as a storage layer within an event streaming platform. When a network element 102 attempts to send a charging event message 104 to a charging server 106 but the attempt is unsuccessful, the network element 102 can write the charging event message 104 to the message broker 108.

In accordance with another aspect of the present disclosure, a replay agent 110 can be configured to read charging event messages 104 from the message broker 108 and deliver them to the charging server 106 when the charging server 106 has become available again.

In some embodiments, a system 100 in accordance with the present disclosure can include a plurality of different network elements 102 that are generating charging events. Different network elements 102 can be configured to communicate with charging servers 106 using different message types and different protocols. The replay agent 110 can be configured to support a plurality of different message types and a plurality of different protocols. The replay agent 110 can be configured to read a plurality of different types of charging event messages 104 from the message broker 108 and deliver each message type to the appropriate charging server 106 using the appropriate protocol. This will be described in greater detail below.

Figure 2A:
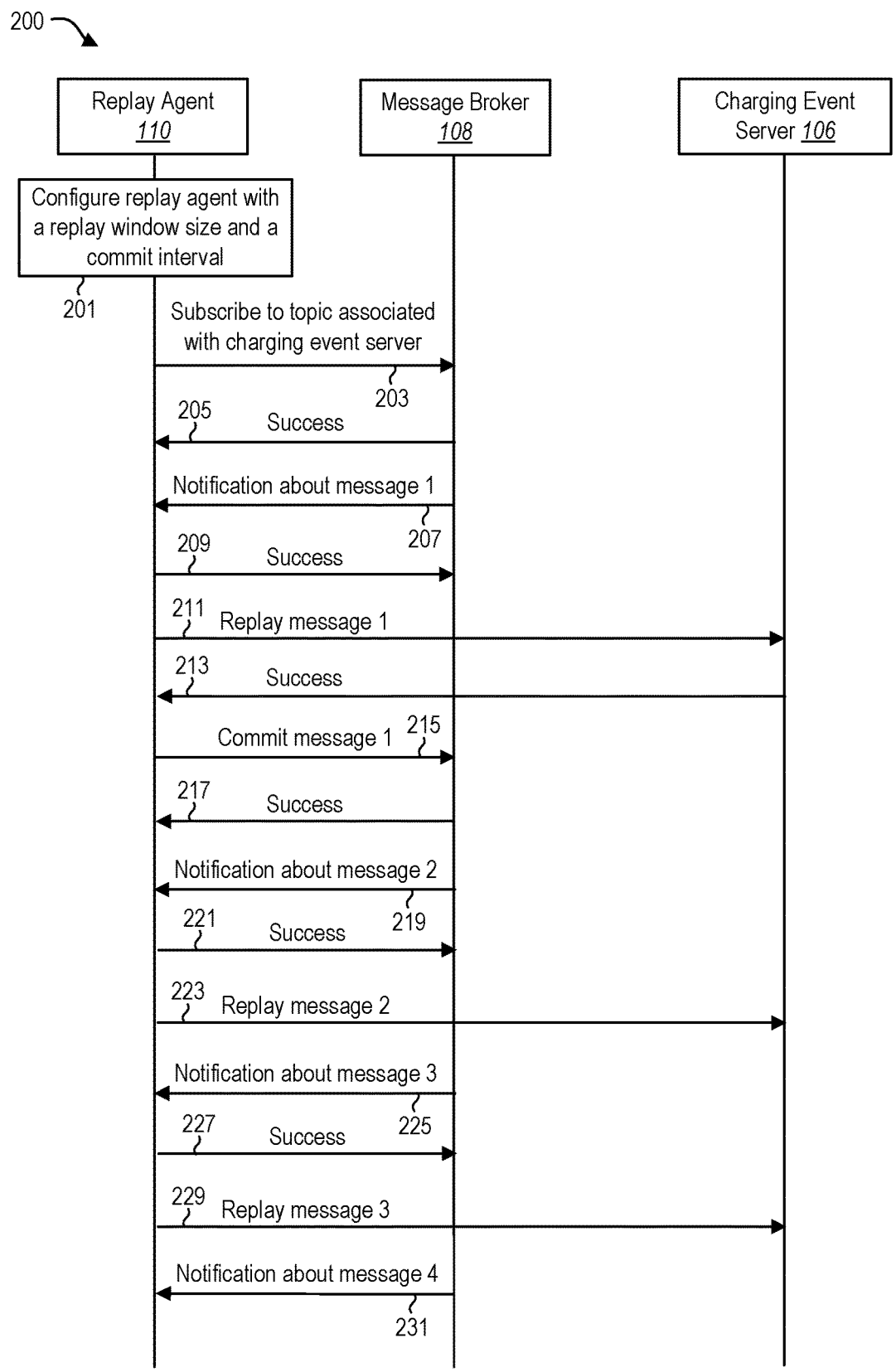
FIGS. 2A and 2B illustrate an example of a method that can be performed by the replay agent, message broker, and charging server in the system of FIG. 1.
Figure 2B:
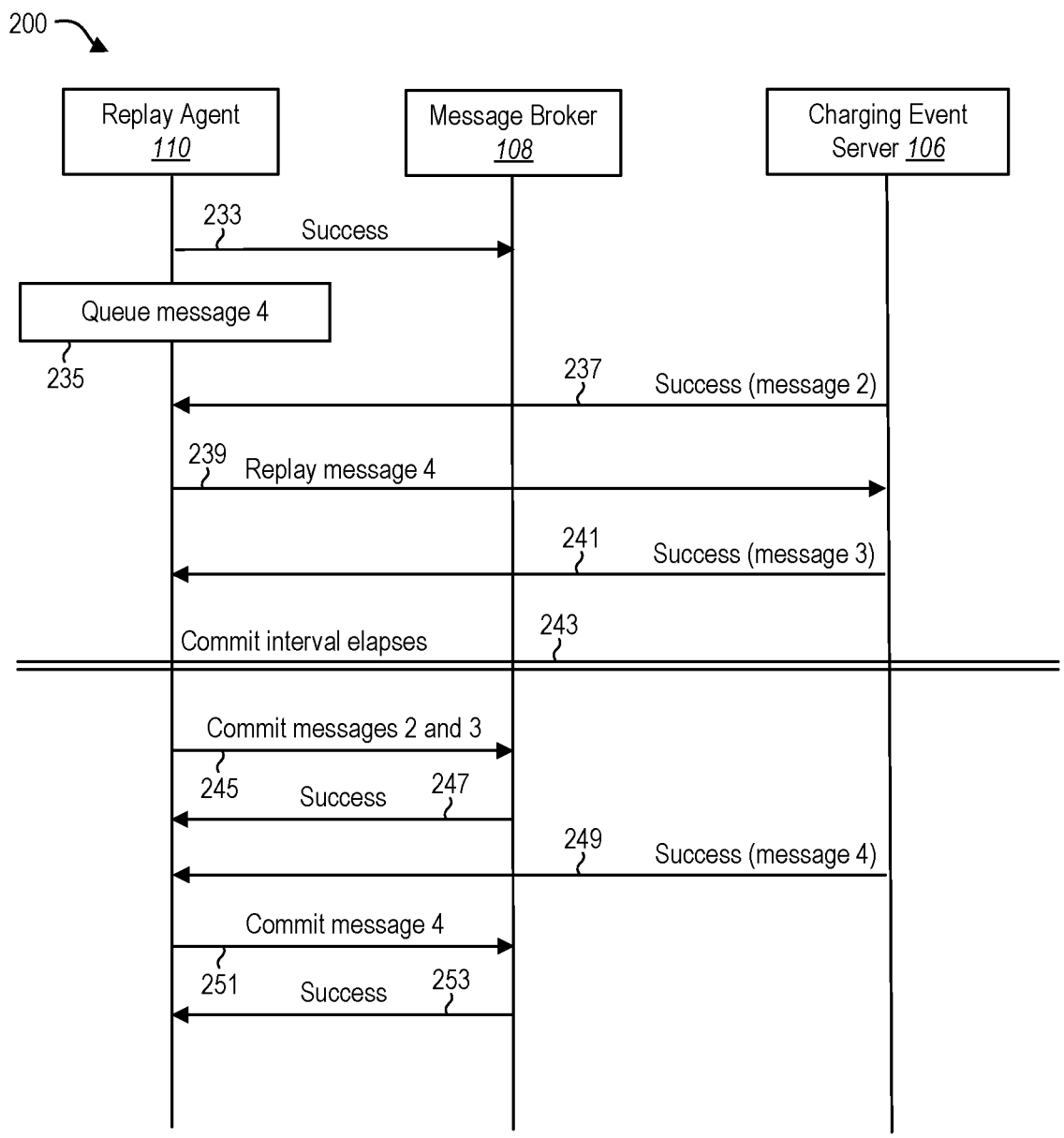

FIGS. 2A and 2B illustrate an example of a method 200 for preserving charging event messages 104 in a mobile telecommunications network when a charging server 106 is unavailable. The method 200 will be described in relation to the system 100 shown in FIG. 1. The method 200 involves a replay agent 110, a message broker 108, and a charging server 106.

The method 200 can include configuring 201 the replay agent 110 with a replay window size and a commit interval. The replay window size can affect how many charging event messages 104 can be outstanding to a particular charging server 106 at any point in time. The commit interval can indicate how frequently the replay agent 110 can commit messages to the message broker 108. Both of these parameters will be explained in greater detail below.

In accordance with the method 200, the replay agent 110 can subscribe 203 to a topic that is associated with the charging server 106. The message broker 108 can respond 205 with an acknowledgement indicating that the replay agent 110 has been successfully subscribed to that topic.

The message broker 108 can then notify 207 the replay agent 110 about a first charging event message 104 (message 1) that should be replayed to the charging server 106. The notification can include an address (e.g., a uniform resource locator (URL)) of the charging server 106, as well as a copy of the charging event message 104 (i.e., message 1) that should be sent to the charging server 106. The replay agent 110 can respond 209 with an acknowledgement indicating that the notification has been received successfully.

In response to receiving the notification about message 1, the replay agent 110 can determine whether the number of outstanding messages in connection with the charging server 106 exceeds the replay window size. In this context, the number of outstanding messages in connection with the charging server 106 can refer to the number of charging event messages 104 that have been replayed to the charging server 106 without receiving an acknowledgement from the charging server 106. In the present example, it will be assumed that the replay window size is two. Because there are not currently any outstanding messages in connection with the charging server 106, the replay agent 110 immediately replays 211 message 1 to the charging server 106. In other words, the replay agent 110 immediately sends a copy of message 1 (which was previously received from the message broker 108) to the charging server 106 (whose address was previously received from the message broker 108). The charging server 106 can respond 213 with an acknowledgement indicating that the charging event message 104 has been received successfully.

In response to receiving the acknowledgement from the charging server 106, the replay agent 110 can send 215 a message to the message broker 108 indicating that message 1 should be committed. The message broker 108 can respond 217 with an acknowledgement indicating that message 1 has been successfully committed.

The message broker 108 can then notify 219 the replay agent 110 about a second charging event message 104 (message 2) that should be replayed to the charging server 106. As before, the notification can include an address (e.g., a URL) of the charging server 106, as well as a copy of the charging event message 104 (i.e., message 2) that should be sent to the charging server 106. The replay agent 110 can respond 221 with an acknowledgement indicating that the notification has been received successfully.

In response to receiving the notification about message 2, the replay agent 110 can determine whether the number of outstanding messages in connection with the charging server 106 exceeds the replay window size. As noted above, in the present example it will be assumed that the replay window size is two. Because there are not currently any outstanding messages in connection with the charging server 106, the replay agent 110 immediately replays 223 message 2 to the charging server 106.

The message broker 108 can then notify 225 the replay agent 110 about a third charging event message 104 (message 3) that should be replayed to the charging server 106. As before, the notification can include an address (e.g., a URL) of the charging server 106, as well as a copy of the charging event message 104 (i.e., message 3) that should be sent to the charging server 106. The replay agent 110 can respond 227 with an acknowledgement indicating that the notification has been received successfully.

In response to receiving the notification about message 3, the replay agent 110 can determine whether the number of outstanding messages in connection with the charging server 106 exceeds the replay window size. As noted above, in the present example it will be assumed that the replay window size is two. Because there is currently only one outstanding message (namely, message 2) in connection with the charging server 106, the replay agent 110 immediately replays 229 message 3 to the charging server 106.

The message broker 108 can then notify 231 the replay agent 110 about a fourth charging event message 104 (message 4) that should be replayed to the charging server 106. As before, the notification can include an address (e.g., a URL) of the charging server 106, as well as a copy of the charging event message 104 (i.e., message 4) that should be sent to the charging server 106. The replay agent 110 can respond 233 with an acknowledgement indicating that the notification has been received successfully.

In response to receiving the notification about message 4, the replay agent 110 can determine whether the number of outstanding messages in connection with the charging server 106 exceeds the replay window size. As noted above, in the present example it will be assumed that the replay window size is two. Because there are already two outstanding messages (namely, message 2 and message 3) in connection with the charging server 106, the replay agent 110 does not immediately replay message 4 to the charging server 106. Instead, the replay agent 110 adds 235 message 4 to a queue.

The charging server 106 can then send 237 the replay agent 110 an acknowledgement indicating that message 2 has been received successfully. This means that message 2 is no longer an outstanding message with respect to the charging server 106. Therefore, the number of outstanding messages in connection with the charging server 106 no longer exceeds the replay window size. In particular, the replay window size is two, and there is only one outstanding message (namely, message 3) in connection with the charging server 106. Because the number of outstanding messages in connection with the charging server 106 no longer exceeds the replay window size, the replay agent 110 can replay 239 message 4 to the charging server 106.

The charging server 106 can then send 241 the replay agent 110 an acknowledgement indicating that message 3 has been received successfully. At this point, the commit interval elapses 243. As noted above, the commit interval can indicate how frequently the replay agent 110 can commit messages to the message broker 108. More specifically, when the commit interval elapses, the replay agent 110 can commit any charging event messages 104 that have not yet been committed and that have been sent to and acknowledged by the charging server 106. In the present example, that means that the replay agent 110 can send 245 a message to the message broker 108 indicating that message 2 and message 3 should be committed. The message broker 108 can respond 247 with an acknowledgement indicating that message 2 and message 3 have been successfully committed.

The charging server 106 can then send 249 the replay agent 110 an acknowledgement indicating that message 4 has been received successfully. Because there are not any outstanding messages at this point, the replay agent 110 can send 251 a message to the message broker 108 indicating that message 4 should be committed. The message broker 108 can respond 253 with an acknowledgement indicating that message 4 has been successfully committed.

Figure 3:
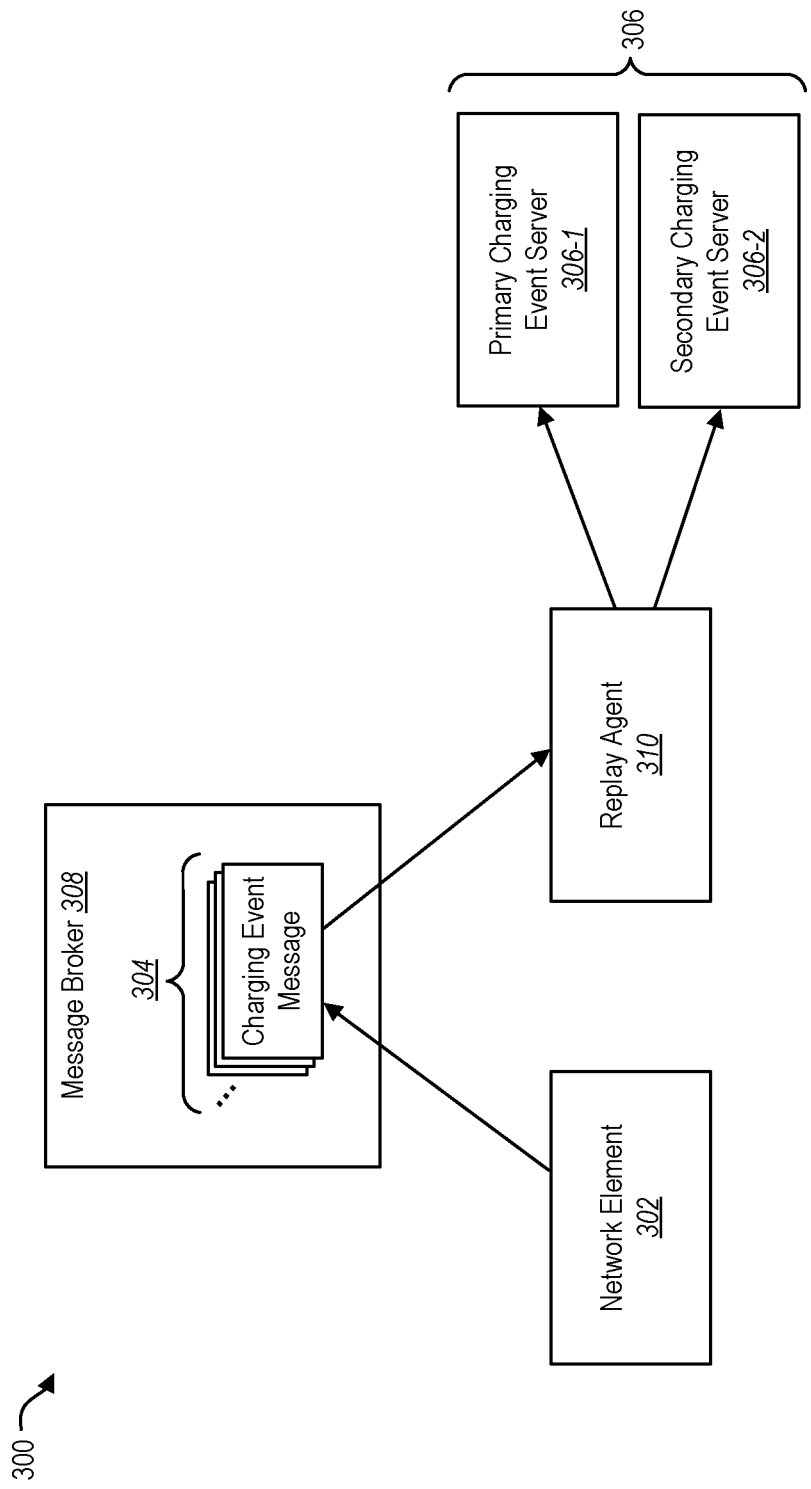
FIG. 3 illustrates an example of a system that supports a high availability architecture for charging servers.

As noted above, a replay agent as disclosed herein can be configured to support a high availability architecture for charging servers in the form of primary and secondary destinations. FIG. 3 illustrates an example of a system 300 in which a replay agent 310 includes this feature.

The system 300 shown in FIG. 3 is similar in several respects to the system 100 that was described above in connection with FIG. 1. The system 300 includes a network element 302 that is configured to generate charging events and send charging event messages 304 to a charging server 306. When the charging server 306 is unavailable, the network element 302 can write the charging event messages 304 to a message broker 308. A replay agent 310 can be configured to read charging event messages 304 from the message broker 308 and deliver them to the charging server 306 when the charging server 306 has become available again.

The system 300 shown in FIG. 3 differs from the system 100 described previously in that the system 300 shown in FIG. 3 includes a primary charging server 306-1 and a secondary charging server 306-2. When the message broker 308 includes a charging event message 304 that should be delivered to a charging server 306, the replay agent 310 can initially attempt to send the charging event message 304 to the primary charging server 306-1. If the attempt to send the charging event message 304 to the primary charging server 306-1 is unsuccessful, the replay agent 310 can then attempt to send the charging event message 304 to the secondary charging server 306-2. For example, if the replay agent 310 sends the charging event message 304 to the primary charging server 306-1 and does not receive an acknowledgement within a pre-defined time period, the replay agent 310 can then send the charging event message 304 to the secondary charging server 306-2.

For simplicity, just one secondary charging server 306-2 is shown in FIG. 3. However, in alternative embodiments a system in accordance with the present disclosure could include a plurality of secondary charging servers. Stated more generally, a system in accordance with the present disclosure could include N secondary charging servers, where the value of N could be any positive integer.

In some embodiments, the N secondary charging servers can be prioritized. When an attempt to send a charging event message to the primary charging server fails, the replay agent can then attempt to send the charging event message to the secondary charging server that has the highest priority. If that attempt fails, the replay agent can then attempt to send the charging event message to the secondary charging server that has the next highest priority. This process can continue until the replay agent has attempted to send the charging event message to all of the secondary charging servers. At this point, the process described above can be repeated until the charging event message is successfully delivered to a charging server.

Figure 4:
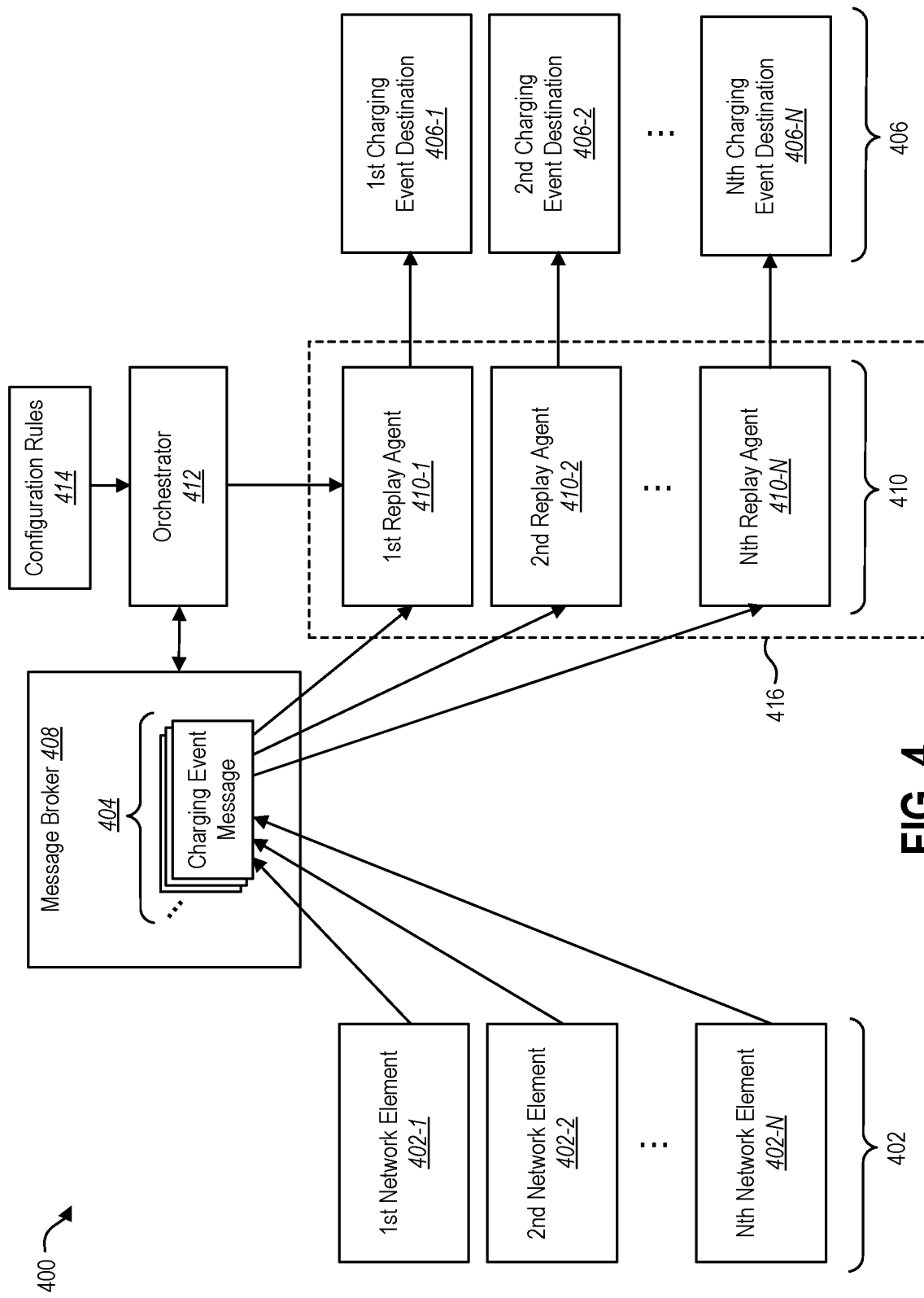
FIG. 4 illustrates an example of a system in which replay agents can be configured to scale in and/or scale out based on the load being experienced by the existing instances of the replay agent from the message broker.

As noted above, a replay agent as disclosed herein can be configured for horizontal scalability. In other words, replay agents can be configured to scale in and/or scale out based on the load that the existing instance(s) of the replay agent are experiencing from the message broker at any given point in time. FIG. 4 illustrates an example of a system 400 in which replay agents 410 are configured in this manner.

The system 400 includes a plurality of network elements 402. In particular, a first network element 402-1, a second network element 402-2, and an Nth network element 402-N are shown in FIG. 4. Each network element 402 can be configured to function similarly to the network element 102 shown in FIG. 1. In particular, each network element 402 can be configured to generate charging events and send charging event messages 404 to a charging server 406. When the charging server 406 is unavailable, the network element 402 can write the charging event messages 404 to a message broker 408.

The system 400 is shown with a plurality of instances of a replay agent 410. In particular, a first replay agent 410-1, a second replay agent 410-2, and an Nth replay agent 410-N are shown in FIG. 4.

In some embodiments, the number of instances of the replay agent 410 that are deployed at any given point in time can vary. For example, the number of instances of the replay agent 410 that are deployed at any given point in time can depend on the load that the existing instance(s) of the replay agent 410 are experiencing from the message broker 408. In some embodiments, the greater the load being experienced by the existing instance(s) of the replay agent 410 from the message broker 408, the greater the number of instances of the replay agent 410 that are deployed.

It could be possible that the number of charging event messages 404 stored in the message broker 408 is too high to be handled by the existing instances of the replay agent 410, which in this case will result in the replay agent 410 scaling out (i.e., the deployment of additional instances of the replay agent 410) to handle those charging event messages 404. On the contrary, the number of charging event messages 404 in the message broker 408 could very well be handled by the existing instances of the replay agent 410, which results in no need of additional instances. In some embodiments, the criteria for spinning more instances of the replay agent 410 could be based at least in part on the CPU and/or the memory in addition to the number of charging event messages 404 stored in the message broker 408.

The system 400 includes an orchestrator 412 that can be configured to monitor the load being experienced by the replay agent 410 from the message broker 408. The orchestrator 412 can also be configured to modify the number of instances of the replay agent 410 that are deployed in the system 400 based on the load being experienced from the message broker 408.

FIG. 4 shows configuration rules 414 being provided as input to the orchestrator 412. The configuration rules 414 can specify when the orchestrator 412 should deploy additional instances of the replay agent 410 and when the orchestrator 412 should deactivate instances of the replay agent 410. The table shown above represents one possible example of the configuration rules 414.

In some embodiments, the instances of the replay agent 410 can be implemented within the same network function 416 (the dotted lines shown in FIG. 4 are intended to represent a network function 416). In such embodiments, the orchestrator 412 can be configured to adjust the number of instances of the replay agent 410 that are deployed by the network function 416 based on the load being experienced by the replay agent 410 from the message broker 408.

Alternatively, in some embodiments each instance of the replay agent 410 can be implemented as a separate network function. For example, each instance of the replay agent 410 can be implemented as a replay agent network function. In such embodiments, the orchestrator 412 can be configured to adjust the number of replay agent network functions that are deployed based on the load being experienced by the replay agent 410 from the message broker 408.

The system 400 is shown with a plurality of charging servers 406. In particular, a first charging server 406-1, a second charging server 406-2, and an Nth charging server 406-N are shown in FIG. 4.

In the depicted embodiment, each instance of the replay agent 410 is shown delivering charging event messages 404 to a separate charging server 406. In particular, the first replay agent 410-1 is shown delivering charging event messages 404 to a first charging server 406-1, the second replay agent 410-2 is shown delivering charging event messages 404 to a second charging server 406-2, and the Nth replay agent 410-N is shown delivering charging event messages 404 to an Nth charging server 406-N.

However, it is not necessary for each instance of the replay agent 410 to communicate with a separate charging server 406, as in the depicted embodiment. In some embodiments, a single instance of the replay agent 410 could deliver charging event messages 404 to a plurality of charging servers 406. Also, in some embodiments, a charging server 406 could receive charging event messages 404 from a plurality of instances of the replay agent 410.

Figure 5:
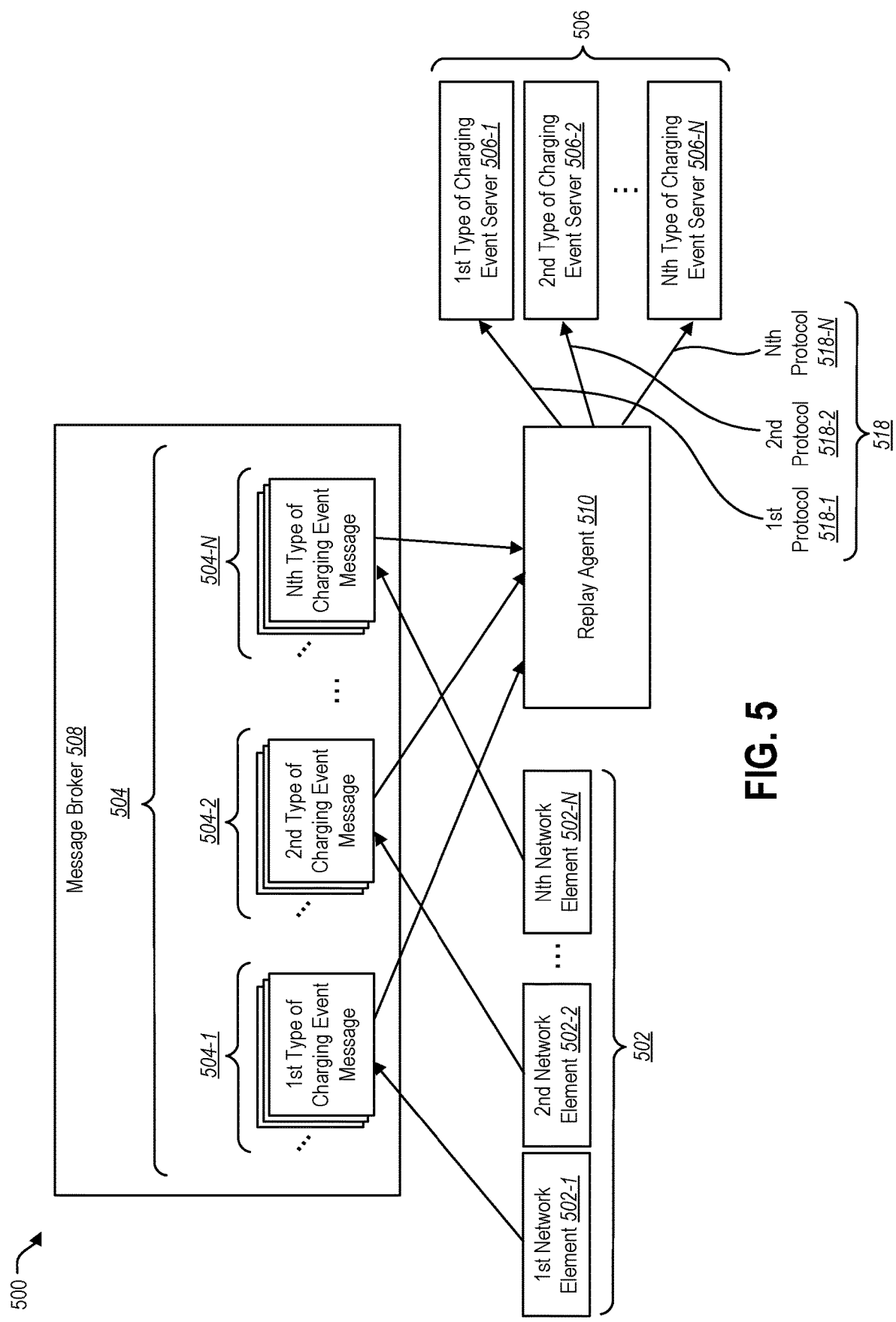
FIG. 5 illustrates an example of a system including a replay agent that is configured to read a plurality of different types of charging event messages and deliver each message type to its charging server using the appropriate protocol.

As noted above, a network could include several different types of network elements that are generating charging events, and a replay agent as disclosed herein can be configured to read a plurality of different types of charging event messages and deliver each message type to its charging server using the appropriate protocol. FIG. 5 illustrates an example of a system 500 in which a replay agent 510 is configured in this manner.

The system 500 includes a plurality of network elements 502 and a plurality of charging servers 506. In particular, a first network element 502-1, a second network element 502-2, and an Nth network element 502-N are shown in FIG. 5. A first type of charging server 506-1, a second type of charging server 506-2, and an Nth type of charging server 506-N are shown in FIG. 5.

In some embodiments, one of the network elements 502 can be a CTF, and one of the charging servers 506 can be a CHF. The CTF can be implemented within a session management function (SMF), and the CHF can be implemented within a converged charging system (CCS). Alternatively, the CTF can be implemented within a Gateway GPRS Support Node (GGSN), and the OCS can be a charging server 506.

However, the system 500 can include other network elements 502 besides a CTF and other charging servers 506 besides a CHF. Another example of a network element 502 that generates charging events is a PGW. In some embodiments, a network element 502 that generates charging events can be a RADIUS client such as a PGW and/or GGSN, and a charging server 506 can be a RADIUS server such as an authentication, authorization, accounting (AAA) server. Other examples of charging servers 506 include a CGF, an OCS, and an OFCS.

Different types of network elements 502 can send charging event messages 504 to different types of charging servers 506. For example, an SMF can send charging event messages 504 to a CCS (or, more specifically, a CHF within a CCS). On the other hand, a PGW can send charging event messages 504 to an OCS and/or an OFCS.

In the embodiment shown in FIG. 5, the first network element 502-1 sends charging event messages 504-1 to a first type of charging server 506-1, the second network element 502-2 sends charging event messages 504-2 to a second type of charging server 506-2, and the Nth network element 502-N sends charging event messages 504-N to an Nth type of charging server 506-N.

Different types of charging servers 506 can require different protocols 518 to be used for sending charging event messages 504. Some examples of different protocols 518 that can be used include REST, RADIUS, DIAMETER, and GTP. In the depicted embodiment, the first type of charging server 506-1 requires a first protocol 518-1, the second type of charging server 506 requires a second protocol 518-2, and the Nth type of charging server 506 requires an Nth protocol 518-N.

When a network element 502 attempts to send a charging event message 504 to a charging server 506 and the attempt is unsuccessful, the network element 502 can write the charging event message 504 to the message broker 508. Different types of network elements 502 can write different types of charging event messages 504 to the message broker 508. In the depicted embodiment, the first network element 502-1 writes a first type of charging event message 504-1 to the message broker 508, the second network element 502-2 writes a second type of charging event message 504-2 to the message broker 508, and the Nth network element 502-N writes an Nth type of charging event message 504-N to the message broker 508.

A replay agent 510 can be provided to read charging event messages 504 from the message broker 508 and deliver them to a desired charging server 506 when the charging server 506 has become available again. Because there are a plurality of possible charging servers 506 where charging event messages 504 can be sent, the replay agent 510 can be configured to select the appropriate charging server 506 where a particular charging event message 504 should be sent. In some embodiments, this selection can be based on information that is contained in the charging event message 504.

When the replay agent 510 sends a charging event message 504 to a particular charging server 506, the replay agent 510 can use the protocol 518 that is appropriate for that charging server 506. In the depicted embodiment, the replay agent 510 can use the first protocol 518-1 to send the first type of charging event message 504-1 to the first type of charging server 506-1. The replay agent 510 can use the second protocol 518-2 to send the second type of charging event message 504-2 to the second type of charging server 506-2. The replay agent 510 can use the Nth protocol 518-N to send the Nth type of charging event message 504-N to the Nth type of charging server 506-N.

Figure 6:
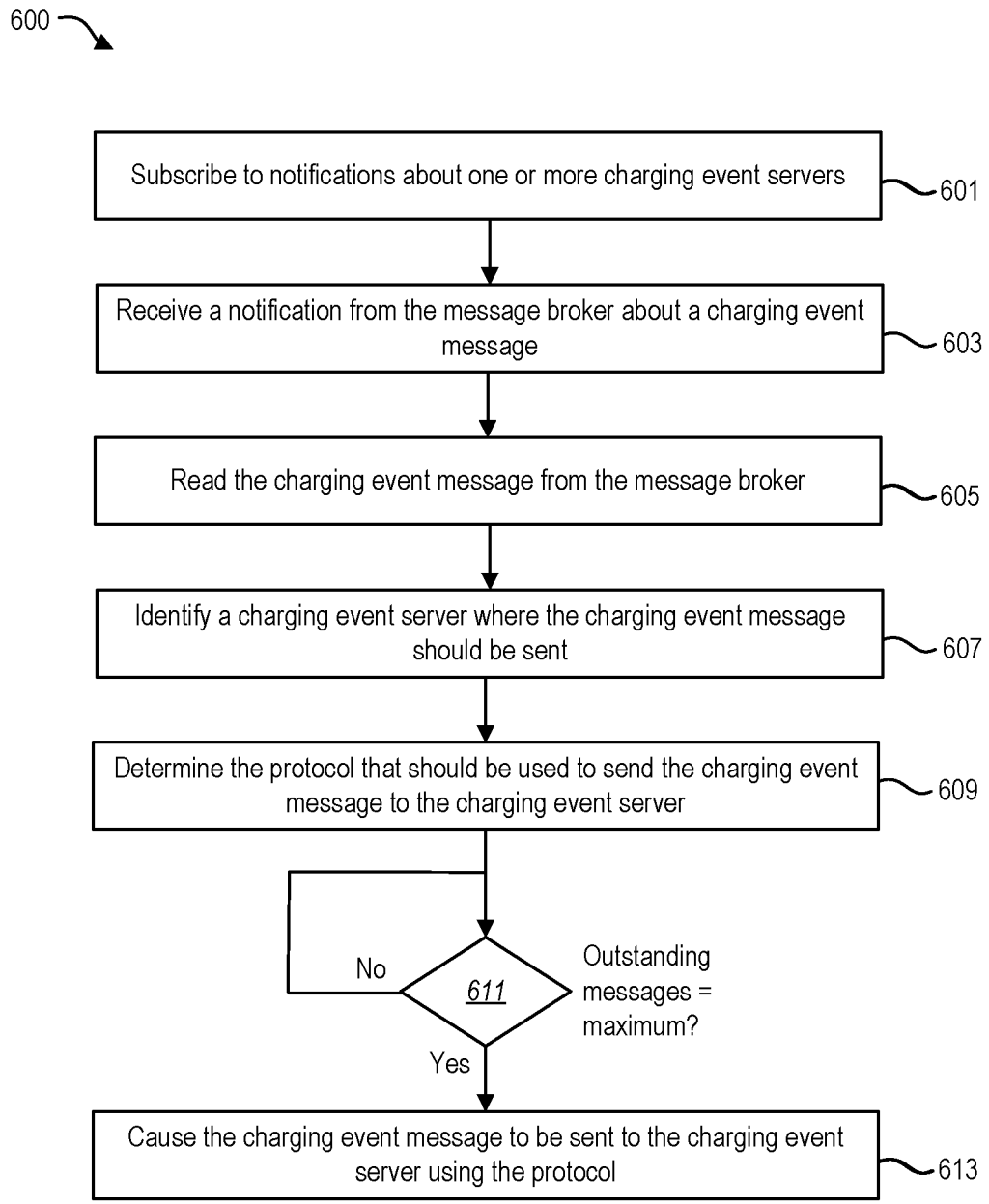
FIG. 6 illustrates an example of a method that can be performed by the replay agent in the system of FIG. 5.

FIG. 6 illustrates another example of a method 600 for preserving charging event messages 504 in a mobile telecommunications network when a charging server 506 is unavailable. The method 600 will be described in relation to the system 500 shown in FIG. 1. The method 600 can be implemented by a replay agent 510.

The method 600 includes subscribing 601 to notifications about one or more charging servers 506. In other words, a replay agent 510 can request to be notified by the message broker 508 whenever the message broker 508 receives a charging event message 504 that should be sent to one or more specified charging servers 506. When the replay agent 510 has subscribed to receive notifications about a particular charging server 506, the message broker 508 can notify the replay agent 510 whenever the message broker 508 receives a charging event message 504 that should be sent to the charging server 506.

The method 600 can also include receiving 603 a notification from the message broker 508 about a charging event message 504 that has been written to the message broker 508. More specifically, the replay agent 510 can receive a notification that a charging event message 504 that should be sent to a charging server 506 that the replay agent 510 has requested to be notified about has been written to the message broker 508.

In response to receiving 603 the notification, the replay agent 510 can read 605 the charging event message 504 from the message broker 508. The replay agent 510 can also identify 607 the charging server 506 where the charging event message 504 should be sent. In some embodiments, the charging server 506 can be included in the notification that is received from the message broker 508. In such embodiments, identifying the charging server 506 can include reading the notification that is received from the message broker 508 and determining the charging server 506 from the information contained therein.

The method 600 can also include determining 609 the protocol 518 that should be used to send the charging event message 504 to the charging server 506. In some embodiments, information about which protocol 518 is used by a particular charging server 506 can be stored in a location that is accessible to the replay agent 510. Such information can be included in one or more data structures (e.g., lookup tables). Thus, once a charging server 506 has been identified, determining the protocol 518 that should be used to send the charging event message 504 to the charging server 506 can include looking up that information in a lookup table or other similar data structure. It is also possible to use any database server to store the information about the protocol supported by a particular charging server 506.

The method 600 can also include determining 611 whether the number of outstanding messages in connection with the charging server 506 exceeds a defined maximum value. As discussed above, the replay agent 510 can be configured to limit the number of charging event messages 504 that are outstanding with respect to a particular charging server 506 (i.e., that have been sent to a charging server 506 without yet being acknowledged by the charging server 506) so that the charging server 506 is not bombarded with a flood of charging event messages 504. In the method 200 that was previously described in connection with FIGS. 2A and 2B, the defined maximum value was represented by the replay window size parameter.

If the number of outstanding messages in connection with the charging server 506 is already equal to the defined maximum value, the method 600 can include waiting until the number of outstanding messages is less than the defined maximum value. For example, the method 600 can include waiting until at least one outstanding message is acknowledged so that the number of outstanding messages is reduced to less than the defined maximum value.

Once the number of outstanding messages is less than the defined maximum value, the method 600 can include causing 613 the charging event message 504 to be sent to the charging server 506 using the protocol 518 that the replay agent 510 previously determined 609 should be used in connection with the charging server 506.

As noted above, the method 600 shown in FIG. 6 can be implemented by a replay agent 510. In some embodiments, a replay agent 510 can repeat acts 605 through 613 of the method 600 each time that a notification is received from the message broker 508 about a charging event message 504 that should be sent to a charging server 506 that the replay agent 510 has requested to be notified about.

As noted above, in some embodiments a plurality of instances of a replay agent instances can be deployed in parallel. In such embodiments, each instance of the replay agent can be configured to implement the depicted method 600.

Figure 7:
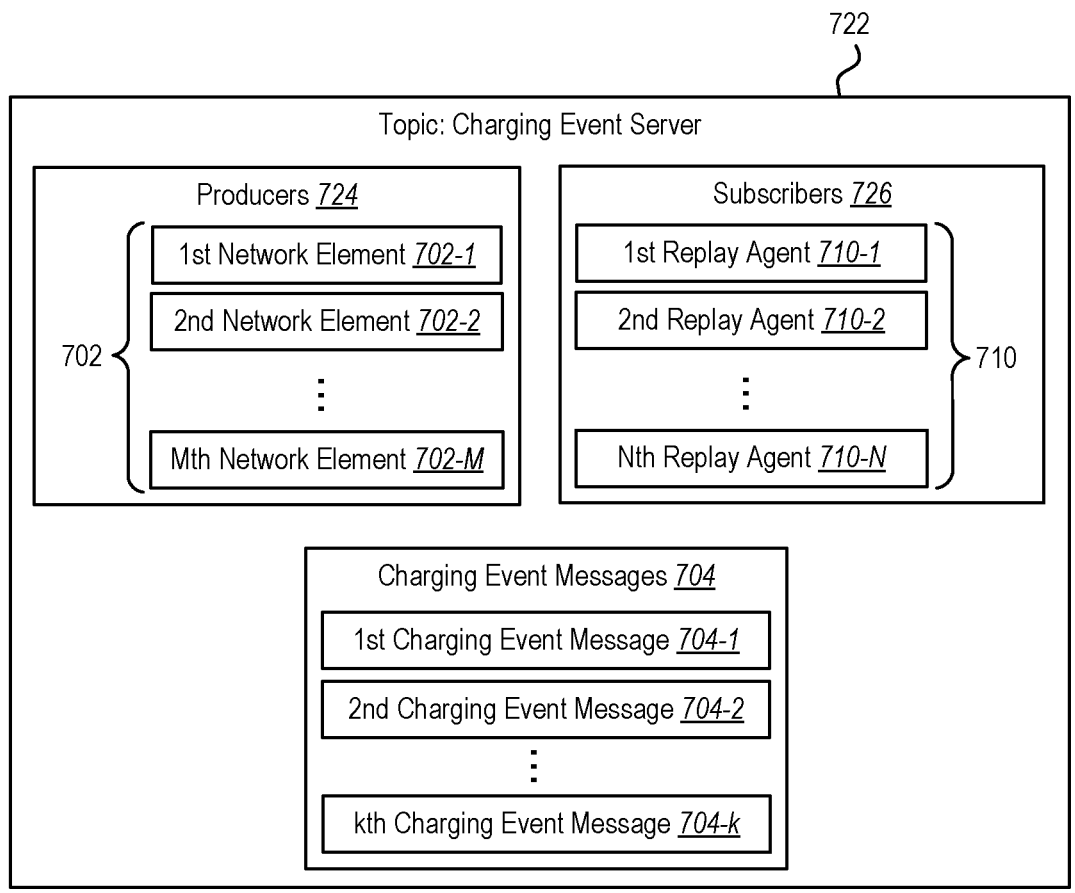
FIG. 7 illustrates an example of a topic that a message broker can create for a charging server.

As noted above, in an event streaming platform, events can be organized and durably stored in topics. In some embodiments, a message broker can store charging event messages in topics. FIG. 7 illustrates an example of a topic 722 that a message broker can create for a particular charging server. The topic 722 can be implemented using one or more data structures. For example, in some embodiments the topic 722 can be implemented using one or more tables.

The topic 722 includes a plurality of producers 724. In the depicted embodiment, the producers 724 include a plurality of network elements 702 that write charging event messages 704 to the topic 722. FIG. 7 shows a first network element 702-1, a second network element 702-2, and an Mth network element 702-M as being included among the producers 724 for the topic 722.

The topic 722 also includes a plurality of subscribers 726. In the depicted embodiment, the subscribers 726 include a plurality of replay agents 710 that read charging event messages 704 from the topic 722. FIG. 7 shows a first replay agent 710-1, a second replay agent 710-2, and an Nth replay agent 710-N as being included among the subscribers 726 for the topic 722.

The topic 722 also includes a plurality of charging event messages 704 that have been written to the topic 722 by the producers 724 (replay agents 710). FIG. 7 shows a first charging event message 704-1, a second charging event message 704-2, and a kth charging event message 704-k as being included among the charging event messages 704 that have been written to the topic 722. These charging event messages 704 are intended to be sent to the charging server that is the subject of the topic 722. When a producer 724 (e.g., a network element 702) writes a charging event message 704 to the topic 722, the message broker notifies all of the subscribers 726 to the topic 722 (e.g., replay agents 710) about the charging event message 704.

Although the topic 722 shown in FIG. 7 includes a plurality of producers 724 and a plurality of subscribers 726, in alternative embodiments a topic 722 can include only a single producer and/or a single subscriber.

Figure 8:
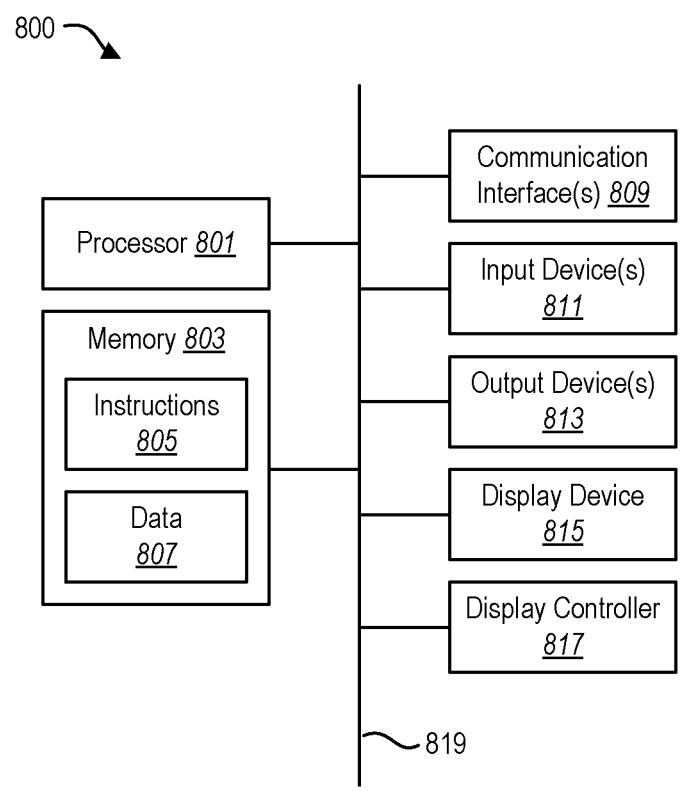
FIG. 8 illustrates certain components that can be included within a computing device.

Reference is now made to FIG. 8. One or more computing devices 800 can be used to implement at least some aspects of the techniques disclosed herein. FIG. 8 illustrates certain components that can be included within a computing device 800.

The computing device 800 includes a processor 801 and memory 803 in electronic communication with the processor 801. Instructions 805 and data 807 can be stored in the memory 803. The instructions 805 can be executable by the processor 801 to implement some or all of the methods, steps, operations, actions, or other functionality that is disclosed herein. Executing the instructions 805 can involve the use of the data 807 that is stored in the memory 803. Unless otherwise specified, any of the various examples of modules and components described herein can be implemented, partially or wholly, as instructions 805 stored in memory 803 and executed by the processor 801. Any of the various examples of data described herein can be among the data 807 that is stored in memory 803 and used during execution of the instructions 805 by the processor 801.

Although just a single processor 801 is shown in the computing device 800 of FIG. 8, in an alternative configuration, a combination of processors (e.g., an ARM and DSP) could be used.

The computing device 800 can also include one or more communication interfaces 809 for communicating with other electronic devices. The communication interface(s) 809 can be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 800 can also include one or more input devices 811 and one or more output devices 813. Some examples of input devices 811 include a keyboard, mouse, microphone, remote control device, button, joystick, trackball, touchpad, and lightpen. One specific type of output device 813 that is typically included in a computing device 800 is a display device 815. Display devices 815 used with embodiments disclosed herein can utilize any suitable image projection technology, such as liquid crystal display (LCD), light-emitting diode (LED), gas plasma, electroluminescence, or the like. A display controller 817 can also be provided, for converting data 807 stored in the memory 803 into text, graphics, and/or moving images (as appropriate) shown on the display device 815. The computing device 800 can also include other types of output devices 813, such as a speaker, a printer, etc.

The various components of the computing device 800 can be coupled together by one or more buses, which can include a power bus, a control signal bus, a status signal bus, a data bus, etc. For the sake of clarity, the various buses are illustrated in FIG. 8 as a bus system 819.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. In some contexts, the term memory can include either volatile or non-volatile memory. Memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a fifth generation (5G) telecommunications environment, a method for preserving charging event messages in a mobile telecommunications network based on a charging server being unavailable, the method being implemented by a replay agent, the method comprising:
assigning the replay agent to a plurality of charging servers;
subscribing to a message broker to receive, at the replay agent, notifications for messages that a network element failed to deliver to one or more of the plurality of charging servers;
receiving, based on subscribing to the message broker, a notification from the message broker about a charging event message that has been written to the message broker;
reading the charging event message from the message broker;
identifying the charging server from the plurality of charging servers where the charging event message should be sent;
determining a protocol that should be used to send the charging event message to the charging server; and
causing the charging event message to be sent to the charging server using the determined protocol when the charging server becomes available.

2. The method of claim 1, further comprising generating a plurality of instances of the replay agent, wherein each instance of the replay agent is configured to read the charging event messages from the message broker and cause the charging event messages to be sent to the plurality of charging servers.

3. The method of claim 2, wherein the plurality of instances of the replay agent correspond to different network functions.

4. The method of claim 2, wherein the plurality of instances of the replay agent are implemented within a single network function.

5. The method of claim 1, further comprising varying how many instances of the replay agent are deployed based at least in part on a load being experienced by the replay agent from the message broker.

6. The method of claim 5, further comprising:
deploying at least one additional instance of the replay agent in response to an increase in the load being experienced by the replay agent from the message broker; and
deactivating at least one deployed instance of the replay agent in response to a decrease in the load being experienced by the replay agent from the message broker.

7. The method of claim 1, wherein causing the charging event message to be sent to the charging server comprises:
detecting that an attempt to send the charging event message to a primary charging server has failed; and
causing the charging event message to be sent to a secondary charging server.

8. The method of claim 1, wherein:
the method further comprises determining whether a number of outstanding messages associated with the charging server is equal to a maximum value; and
the charging event message is sent to the charging server based on the number of outstanding messages associated with the charging server being less than the maximum value.

9. The method of claim 1, wherein:
the message broker comprises a storage layer of an event streaming platform; and
the replay agent comprises a client application of the event streaming platform.

10. The method of claim 1, wherein:
the message broker comprises a topic corresponding to the charging server; and
subscribing to the message broker for the notifications comprises subscribing to the topic.

11. In a fifth generation (5G) telecommunications environment, a system for preserving charging event messages in a mobile telecommunications network based on a charging server being unavailable, the system comprising:
one or more processors;
a message broker comprising persistent storage;
a network element that is executable by the one or more processors to generate a charging event message, attempt to send the charging event message to the charging server, and write the charging event message to the message broker in response to determining that the attempt to send the charging event message to the charging server has failed; and
a replay agent assigned to the charging server, the replay agent having instructions thereon being executable by the one or more processors to:
subscribe to the message broker to receive, at the replay agent, notifications for messages that the network element failed to deliver to the charging server;
receive, based on subscribing to the message broker, a notification from the message broker about the charging event message that has been written to the message broker;
read the charging event message from the message broker; and
cause the charging event message to be sent to the charging server when the charging server becomes available.

12. The system of claim 11, further comprising an orchestrator that is configured to vary how many instances of the replay agent are deployed based on a load that is being experienced by the replay agent from the message broker.

13. The system of claim 11, wherein causing the charging event message to be sent to the charging server comprises:
detecting that an attempt to send the charging event message to a primary charging server has failed; and
causing the charging event message to be sent to a secondary charging server based on detecting that the attempt to send the charging event message to the primary charging server has failed.

14. The system of claim 11, wherein:
the replay agent is additionally executable by the one or more processors to determine whether a number of outstanding messages associated with the charging server is equal to a maximum value; and
the charging event message is sent to the charging server based on the number of outstanding messages associated with the charging server being less than the maximum value.

15. The system of claim 11, wherein:
the message broker comprises a storage layer of an event streaming platform; and
the replay agent comprises a client application of the event streaming platform.

16. The system of claim 11, wherein:
the message broker comprises a topic corresponding to the charging server; and
subscribing to the message broker for the notifications associated with the charging server comprises subscribing to the topic.

17. The system of claim 11, wherein:
the network element comprises a charging trigger function (CTF); and
the charging server comprises a charging function (CHF) within a converged charging system (CCS).

* * * * *